United States Patent [19]

Clement

[11] Patent Number: 4,780,179
[45] Date of Patent: Oct. 25, 1988

[54] METHOD FOR PRODUCING PULP FROM PRINTED UNSELECTED WASTE PAPER

[76] Inventor: Jean Marie Clement, Via Monte Rosa 75, Milano, Italy

[21] Appl. No.: 822,943

[22] Filed: Jan. 27, 1986

Related U.S. Application Data

[63] Continuation of Ser. No. 482,623, Apr. 6, 1983, abandoned.

[30] Foreign Application Priority Data

Apr. 30, 1982 [IT] Italy .................... 67514 A/82

[51] Int. Cl.⁴ .............................................. D21C 5/02
[52] U.S. Cl. .................................. 162/5; 162/7; 162/8; 162/55
[58] Field of Search .................. 162/4, 5, 7, 8, 55

[56] References Cited

U.S. PATENT DOCUMENTS

| | | | |
|---|---|---|---|
| 2,859,110 | 11/1958 | Sanford | 162/4 |
| 3,057,769 | 10/1962 | Sandberg | 162/4 |
| 3,354,026 | 11/1967 | Illingworth | 162/5 |
| 3,849,246 | 11/1974 | Raymond et al. | 162/4 |
| 3,957,572 | 5/1976 | Eriksson | 162/4 |
| 4,076,578 | 2/1978 | Puddington | 162/5 |
| 4,360,402 | 11/1982 | Ortner et al. | 162/5 |

FOREIGN PATENT DOCUMENTS 92124 10/1983 European Pat. Off. ............. 162/4

OTHER PUBLICATIONS

Burns, "Waste Paper Preparation Plant and Systems", Paper Technology, Jun./Aug. 1973, pp. 196–205.

*Primary Examiner*—David L. Lacey
*Assistant Examiner*—K. M. Hastings
*Attorney, Agent, or Firm*—McCormick, Paulding & Huber

[57] ABSTRACT

A waste paper recycling process relates to the treatment of a mixture of waste paper containing non-cellulosic contraries and printing inks, in order to release the contraries from the fibers and further to separate them from the stock in order to produce re-usable pulp for the production of paper and board.

The invention has to do with new and useful improvements in methods for first removing the non-ink contraries from the fibrous mass and second releasing and then removing the ink particles from the said fibrous mass.

The invention is directed to the treatment of the fiber slurry produced during the ink separation stage, after the ink releasing stage has been applied. One aim of the process is to allow both the use of the fibers and the mineral fillers contained in that slurry, for pulp and board making, and the use the solids-free water contained in the same slurry as the washing liquid in the previous ink-separation treatment, thus closing the fibers and the water circuits.

This process includes chemical and thermo-mechanical treatments, starting under alkaline conditions, which may become neutral at the end of the process.

18 Claims, 1 Drawing Sheet

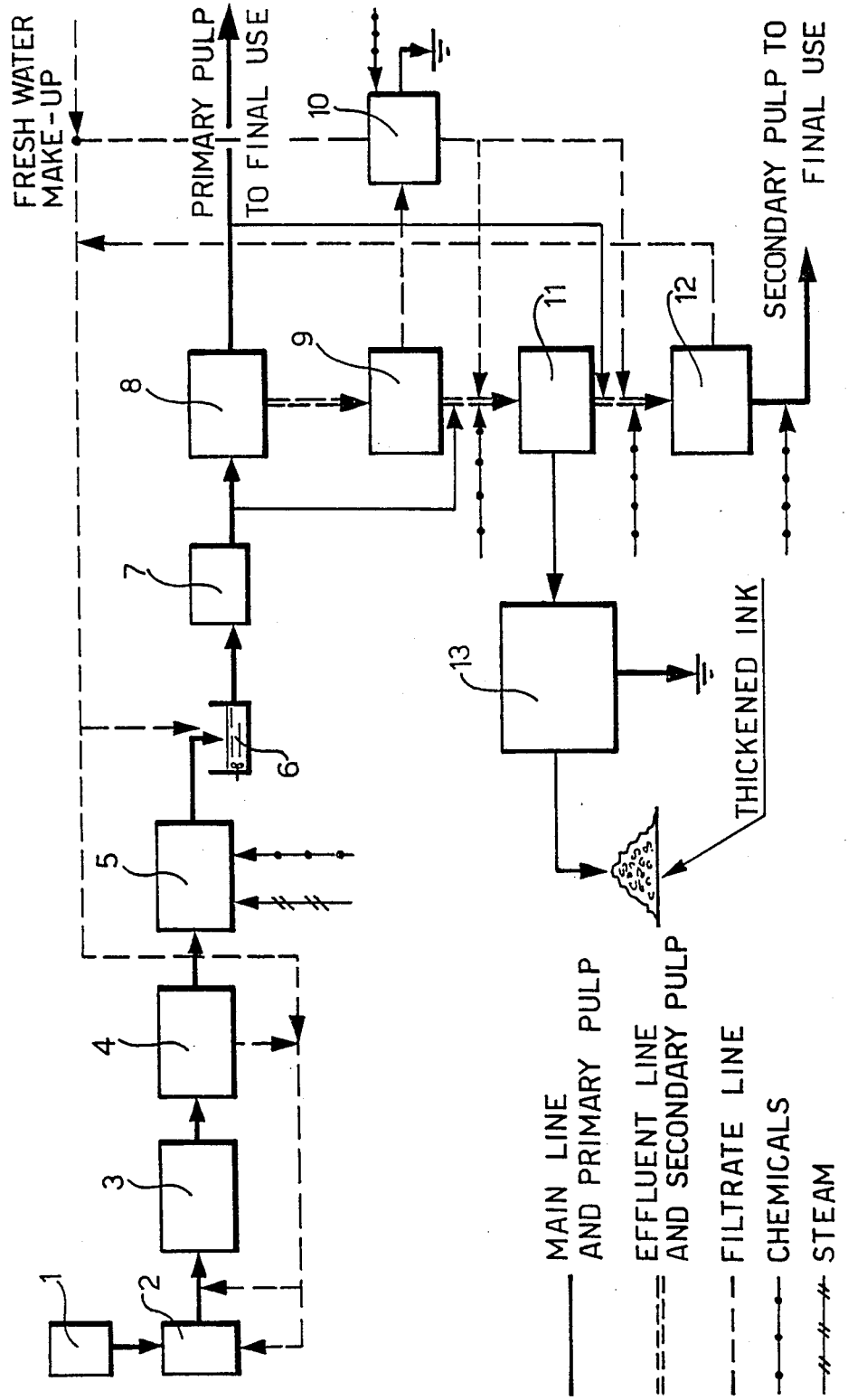

METHOD FOR PRODUCING PULP FROM PRINTED UNSELECTED WASTE PAPER

This is a continuation of co-pending application Ser. No. 482,623 filed on Apr. 6, 1983, now abandoned.

FIELD OF THE INVENTION AND REVIEW OF THE PRIOR ART

Recycling of waste paper is possible only after most of the non cellulosic contaminants have been removed from the fiber mass. These contaminants may have been introduced during the printing steps (carbon black, pigments, ink vehicles, ink fixating polymers, etc. . . ), during converting, (varnishes, coats, binders, wrapping, etc. . . ) and later during the collecting phase (metallic pieces, plastics, soils and dirt of any kind).

Removing of the contraries generally occurs based on chronological dimensional sequences, through screening, magnetic separation, first in dry conditions and later in aqueous suspension.

The fiber mass is then screened through perforated plates and finer contraries are removed by centrifugal and centripetal cleaners.

The ink particles are not substantially removed during the preceding steps, and this operation is achieved in two steps: (a) detaching the ink particles from the fiber surface, through the combined action of chemicals, temperature and mechanical shear forces and (b) removing these particles from the pulp slurry.

Generally, all the contraries including the ink particles, are released from the fibers during the defibering phase. The waste paper is treated in a pulper, under alkaline conditions at 50°-60° C. temperature, in order to be well defibered and transformed into a pumpable slurry. An alternative to this process is to operate the pulper in cold conditions, then thicken the pulp above 15% consistency, then heat the pulp with steam at 60° C. introducing at that point the de-inking and bleaching chemicals. The pulp then remains in a reaction tower during 2-3 hours without any mechanical action.

The first drawback of these techniques is that all contaminants are submitted to the thermal treatment, including the ones which have low melting points, such as binders, hot melts, plastics and other "stickies". By this way, they become dispersed and cannot be removed any more by the conventional means, and will precipitate again on paper machine elements such as doctor blades, wires, felts, pipe walls, etc. . . , creating operating problems and loss of efficiency.

A second drawback is that these ink-releasing techniques have a weak action on the modern inks such as the rotooffset inks, where ink vehicles are made of synthetic resins which form an insoluble polymer on the surface of the fibers. The same consideration applies for xerocopy printed paper and varnished papers, where temperatures in the range of 60° C. will provide neither any softening of the ink vehicles nor any weakening of the bondings between the fibers and these vehicles.

An other limitation of these techniques is that it is not possible to increase the temperature of the ink releasing step, because the combination of the alkalinity and the temperature during a long time will result in an unacceptable yellowing of the pulp, specially if some groundwood is present in the mixture to be treated.

Ink removing techniques in use to-day are essentially two: floatation and washing.

In flotation, the diluted fiber slurry is intensively mixed with air after a hydrophobe ink collector has been added. Then stock is naturally deaereted and air bubbles collect the ink particles during the upwards travel to the surface. The resulting black foam is then collected and treated separately through centrifuges, then disposed of;

In washing, a very old and well known process, the finest dispersed particles are removed through several dilutions and squeezing cycles, generally arranged as a counter-current cascade configuration. The effluent of the first squeezing sequence contains all the free fine ink particles, but also a great quantity of fine cellulosic fibers and most of the mineral fillers, and are sewered and treated according to the local pollution regulations.

Some other ink removing techniques exist, such as solvent extraction but have not been followed by wide indutrial application, due to high production cost and low quality of the produced pulp.

In the U.S. Pat. No. 4,076,578 Puddington et Al. recall the fundamental concept of de-inking: (a) releasing ink from the paper fiber by mean of chemicothermomechanical treatment and (b) separating of dispersed ink particles from the pulp, then proposes a different method to achieve this goal, through absorption of the ink particles onto the surface of solid particles, followed by the removal of said particles from the pulp, and then removal of the ink from those solids.

Nowadays, none of the above mentioned processes has asserted itself because each of them presents some drawbacks.

The flotation is a low consistency process (between 1% and 2%) and thus involves high volumes of pulp, with consequent high investment cost. Also, the nature of this process is essentially physico-chemical and thus its stability is greatly related to the sability of the composition of the waste paper, the type of fibers (chemical or mechanical), the type and content of mineral filler, the calcium ion concentration. Consequently, the brightness of the de-inked pulp shows undesired high fluctuations. These brightness variations are also accompanied by all composition variations coming together with the raw material (waste paper), without any possibility of control or continuous measurement and monitoring.

To-day, it is generally admitted that the first condition for the good operation of a modern fast papermachine is the constancy of operating parameters, the most important one being the composition of the stock feeding the machine. Unfortunately, it is not possible to control the composition of a waste paper lot as easily as a virgin pulp bale. For this reason, the efficiency decrease of high-speed paper machines using high percentages of flotation de-inked pulp is mainly caused by the uncontrolled variations of the stock composition rather than by the brightness (or de-inking efficiency) variations. This problem can be solved using selected classified waste paper, at a price which makes the de-inked pulp uncompetitive respect to the virgin pulp, assuming that such type of waste is available.

Finally, the flotation process needs to be continuously controlled, on a three shift basis, by highly specialized chemical experts using sophisticated instrumentation and laboratory, thus appreciably increasing the production cost.

The washing process involves simpler, cleaner, and easier to control equipment, in particular when washing occurs at consistencies between 3% and 15%.

This process does not require any specialized control and it is admitted that not only the quality (cleanliness and strength) of the washed pulp is definitely higher than for the floated pulp, but this quality is much more constant and less sensitive to raw material variations of composition, thus offering a higher "runability" of the pulp in the paper machine room.

In fact, the principle of washing on a perforated plate statistically says that elements having a smaller size than the plate openings should pass through the plate. It appears that the variations of composition of the stock to be de-inked (fines, groundwood, mineral fillers) will reverberate on the fraction lost through the plate, giving a final product almost constant in quality, if not in quantity. This principle allows for the use of unselected waste paper, a lower quality product having a much lower cost and higher availability.

On the other hand, this process needs a much higher quantity of water, and produces the equivalent higher quantity of effluents which still contain a great quantity of valuable products, cellulosic short fibers, mineral fillers, mixed together with the undesired ink. Besides that direct loss, it is necessary to consider the indirect cost due to the abatement of the pollution created by the solids contained in the effluents.

In conclusion, it can be said that if flotation de-inking presents high investment and operating cost together with low constancy of the quality of the final product, washing de-inking also shows a high similar cost of the product due to both the intrinsical low yield of the process and the pollution abatement cost.

In order to minimize the negative aspects of each one of these basic processes, their supporters have proposed several combinations of them, keeping in mind to produce only one de-inked pulp starting from one waste paper mixture.

In the French patent application No. 79 19392, M. Fritz Zeeb of Voith Cy. suggests to remove the fine fibers fraction together with the mineral fillers from a flotation de-inked pulp, using screens and strains arranged as washing elements. This process, which is only summarily described without any example, seems to add up both costs and drawbacks of flotation and washing.

In the TAPPI magazine, vol. 63, No. 9, September 1980, M. Lothar Pfalzer of the same Voith Cy., while recalling the same concept (page 116, FIG. 3), specifies that the fine fiber fraction and mineral fillers are centrifugated and then disposed of and lost. It also appears from this publication that the effluent is totally sedimented after having been flocculated by addition of aluminum sulfate, but it is also specified that a good dispersion of the ink particles can be obtained at high and well controlled pH. These two statements are rather contradictory and make this concept hardly applicable in practice.

M. Pfalzer also suggests the opposite philosophy (page 114, FIG. 1), which consists of a total flotation followed by a total sedimentation of the effluents of a conventional washing process. For the same reasons as above, which are: the low yield of the washing process, the non-compatibility between ink dispersing high pH and aluminum sulfate sedimentation low pH, the addition of the costs and drawbacks of each individual process, this proposal has not been applied on an industrial scale.

In the French patent application No. 78 29637, M. Calmanti of Montedison Cy. suggests in a more simple way to separate the ink particles from the fine fibers and the mineral fillers contained in the effluents of a washing process, by means of a simplified flotation process where no chemicals are added. It is also stated that the chemicals added at the begining of the process (pulping stage) will also provide for the ink collecting function. In this process, the so-called "clarified" effluents which actually contain most of the fibers and mineral fillers lost during the washing step, are totally recycled ahead of the process.

A tentative application of this process had to be quickly abandoned for two reasons. At first, it has not been possible to obtain a satisfactory selective removal of the ink during the flotation, because of the antagonistic functions of the two chemicals mixed together at the pulper: (a) dispersing of the ink needed during washing, (b) coagulation of the ink needed during flotation. So, too much fibers and fillers were floated together with the ink resulting in a quick overloading of the sewer system, and immediate shut down of the plant.

Second, it has not been possible to recirculate continuously ahead of the washers, an effluent which contains most of the fines and fillers lost by the same washers. This total recirculation has quickly resulted in (a) a drop of the brightness due to the poor ink removal efficiency and (b) an unacceptable drop of the hydraulic capacity of the thickening elements. Both can be attributed to the saturation of the circuit with fines and fillers, dimensions of which are of the same order of magnitude than the ink particles.

In the Italian patent application No. 26944 A/80, M. Calmanti recalls the same principle, where the effluents at a concentration of 0,14% would be selectively floated with the only addition of air, and then totally recycled ahead of the process together with their suspended solids. M. Calmanti nevertheless suggests to install a "quick" flotation, a third flotation, installed ahead of the washing process. This configuration does not seem to bring any answer about the two basic previous problems; (a) how is it possible to have the best dispersion together with the best coagulation, (b) how is it possible to avoid the saturation, the clogging of the thickening elements, and the loss of the ink removal efficiency, due to the recirculation of the fines and the fillers together with the effluent.

GOALS OF THE INVENTION

The present invention aims to provide a practical and integral industrial process which allows to produce, in a continuous way and starting from a mixture of unselected waste papers, three separate products, namely:
 (a) a totally cleaned and de-inked pulp having constant and controlled brightness and fiber classification, having a very low and constant fillers content;
 (b) a totally cleaned and de-inked pulp having a fine fiber classification and a very high fillers content, these two parameters being variable in both quality and quantity;
 (c) an effluent which does not practically contain suspended solids, which has not been submitted to any pH reversion, which does not contain any flocculation or sedimentation chemical agent, and thus is immediately and totaly re-usable as the dilution and washing liquid during the ink removal step of the de-inking phase.

A further aim of this invention is to provide a practical and advantageous improved method for de-inking these grades of printed papers and boards which cannot be correctly de-inked by conventional methods.

An other aim of this invention is to provide a practical and advantageous method which allows high quality paper and board at high speeds using the low quality waste grades which could not be used for such noble purpose when treated by conventional methods.

The invention is also directed to the application of modified and purposely adapted ink removal processes, such as washing, selective separation, flotation, coagulation, filtration, onto the high ink-content slurry produced by the primary ink removal process.

The invention also aims to allow for the use in paper making of the by-products of a washing de-inking process, either on the paper machine which will use the primary pulp, or on a different paper machine.

An object of this invention is to provide a to create a constant and controlled composition of the pulp used for paper making, which can be different from the composition of the incoming waste paper mixture. This object is achieved by pumping controlled flows of each one of the two components and mixing them ahead of the paper machine(s) in the desired percentage; the capacities of the chests act as buffers between waste paper and paper machine stock compositions.

An other object of this invention is to increase the value of the by-product (the secondary pulp) by the fact that good long fibers can be extracted from the main line in order to optimize the operation both of the selective separation of the ink and of the filtration on fiber mat.

A further object of this invention is to accomplish the selective separation of the ink at a stage where this ink is highly concentrated (approximately three times more than in the main pulp), thus increasing the efficiency of the chemicals.

An ulterior object of this invention is to achieve the selective separation of the ink (which is the more delicate operation of the whole recycling process), in a satellite circuit of reduced capacity (approximately one third of the flow through the main line), thus being easier to operate and requiring lower investment cost.

This invention then aims to insure the highest possible constancy of quality of the primary pulp, by the fact that the variations of fines and fillers contents will instantaneously reverberate on the fraction produced by the satellite circuit, which in turn can also be stabilized by mean of a thorough mixing and high retention time in the final buffer chest.

With these and other aims and objects, the nature of which will become more apparent, a fuller understanding of this invention will be gained by reference to the following detailed description and the appended claims.

DESCRIPTION OF THE INVENTION

The following detailed description, together with the attached schematic flow-sheet, refers to one preferred practical application of the invention, although other procedures can also be applied.

Following the flow-sheet, the bales of waste paper (1) are loaded into a pulper (2) by means of a loading mechanism, together with the recycled water and eventual caustics in order to bring the pH at values above 7. It is possible but not mandatory to introduce part or all of the quantity of dispersing chemicals required by the ink-releasing action, during the pulping operation.

The pulp is then diluted using recycled water and pumped through one or several stages of screens and cleaners (3) in order to release contraries and contaminants from the paper surface, and further remove them from the pulp slurry.

When the de-inked pulp is used for high quality paper production or on high-speed machines, such as light weight coating base or newsprint, this operation must be done in the same way it is done with chemical or mechanical virgin pulps, using the same equipment and operating parameters. In particular, the best results have been obtained through a combination of pressurized slotted screens equipped with 0.3 mm. slot width working at 1% consistency followed by 4 inch size cleaners working at 2,8 bars pressure drop and 0,6% consistency in the first stage.

It is anyhow of paramount importance that the temperature of the stock be kept as low as possible so that the low melting point contaminants will remain rigid and will not extrude through the slotted screens and thus be eliminated by the screens. This pulp is then thickened (4) to the consistency required by the ink releasing process. The effluents produced by this thickening stage can easily be recycled, as they are cold and do not contain much fibers and very little ink. At the beginning of the following ink-releasing step (5) chemicals are mixed together with the fiber suspension. Caustics are added in order to raise the pH up to 9-10, together with oxydizing agent (such as hydrogen peroxide), and stabilizers (such as sodium silicate), and dispersing agents (surfactants, etc...). The basic parameters of this process, - temperature, pressure, specific energy, chemicals dosing - will be determined in order to insure the optimum detachment of the ink particles from the surface of the fibers together with their finest dispersion inside the pulp.

In the following examples, this operation has been made in a kneader, also called triturator, which permits the temperature to be brought to the desired value (i.e. above the melting point of the ink vehicles) within few seconds and simultaneously applies very strong shear forces at high consistency and in presence of de-inking agents.

The principle of the operation is that at first, the combined actions of ink-releasing chemicals and temperature (90°-130° C.) will soften the ink vehicles and weaken the bondings between the same and the fibers, and then the combined actions of ink-dispersing chemicals and intense shear forces will detach and finely disperse these particles inside the fiber suspension. The high consistency (20-30%) allows to treat very low volumes of pulp in small machines during a very short time (2-3 minutes), thus avoiding the yellowing of the pulp and increasing the efficiency of the chemicals.

This pulp then remains 5 to 20 minutes in a latency chest (6), at a consistency between 2% and 5%. It may then be deflaked (7) in order to thoroughly separate the fibers bundles one from the other, and thus facilitate the ink removal from the slurry.

The fibrous suspension finally goes through the ink removal process (8) which can be advantageously composed of multi-stage, counter-current, high consistency washing. The number of stages is choosen according to the quantity of ink to be removed and to the desired final brightness. The extraction of the water is conducted through strains of perforated plates, the dimensions of the openings of which will be selected in order to allow for a given quantity of fibers to be carried away together with the effluent, thus ensuring the optimum operation of both the following ink selective separation process, and the final filtration of the recovered satellite secondary pulp.

In case a filler-free secondary pulp is desired, the effluents from the washing step (8) can advantageously be strained again on one or several fine mesh filters (9). By this means, it is possible to remove at each filter stage up to 80% of the mineral fillers contained in that slurry. In such a case, the finest fraction must be sent to a conventional alkaline clarifier (10) and then be disposed of. The clarified fraction is then returned ahead or after the following ink selective separation step (11), according to the operating parameters of this last process (consistency, temperature), and according to the required brightness.

The necessary chemicals are also introduced ahead of this step. In case this process is a selective flotation, ink collectors such as fatty acids or their sodium or calcium soaps can be added, taking care to insure a mixing time of about 5 minutes at a temperature of about 35° to 45° C.

It may be worthy to recall that the dispersing agent used during the washing step has a negative effect both on the coagulation produced by the collecting agents during the flotation step, and on the drainability (freeness) of the fibrous suspension during the filtration step. It will be good to inactivate or neutralize these agents for example by precipitation with calcium chloride or calcium hydroxide. The precipitation of the sodium silicate will also contribute to increase the brightness of the secondary pulp through the formation of a precipitated mineral filler. It has also been observed that the quantity of mineral fillers removed together with the foam during the flotation step may vary from 30% up to 70% according to the operating parameters of the process: flotation time, temperature, pulp consistency, dosing and type of chemicals. The rejected foam containing the ink is then pumped to centrifuges or filter-presses and disposed of. The loss of solid particles has been observed to be between 10% and 20% of the flow of secondary pulp, which means about 3% to 6% of the total quantity of pulp feeding the washing step (8).

It has also been observed that the maximum efficiency of the ink removal has been reached at much higher consistencies that the ones recommended by the suppliers of the cells. For example, a cell designed to work at 1% has shown best results between 1,5% and 2%. This peculiarity allows for the treatment of lowest quantities of effluents, using higher consistencies during washing, and larger holes in the extractors perforated plates.

When the requested concentration for the ink selective separation process is higher (say 0,5% or more) than the maximum concentration which can be given to the effluent of the washing step, some heavy stock can be advantageously extracted from the latency chest (6). In this case, the small quantity of long fibers added to the secondary pulp will help in forming the filtering mat in the final filtration step (12).

The selective separation of the ink (11) can also be a process based on adsorption of the ink upon the surface of non-soap solids, as recommended by Ira Puddington et Al. in the U.S. Pat. No. 4,076,578.

The de-inked slurry leaving the process (11) is then filtered on fibrous mat up to at least 4% consistency, possibly above 10% in order to remove from the final secondary pulp the maximum possible quantity of dissolved salts.

In case this pulp contains a very high quantity of ground-wood fines and fillers (such as mixtures of newsprint and magazine paper), the pH ahead of the filtration step has to be dropped down to values below 8, by addition of sulfuric acid (preferably to aluminum sulfate), under intense mechanical agitation (as could be the suction side of a centrifugal pump), and after some long fibers extracted from the washed final primary pulp has been added to the the satellite slurry to be filtered.

It has been observed that the application of equipment such as Polydisk or Waco Filters to the thickening process (12) has permitted to produce clear filtrate having less that 100 ppm suspended solids and consequently totally re-usable in the pulping (2), cleaning (3) and washing (8) processes without any further clarification.

The final thickened secondary pulp leaving (12) must then be brought to a pH compatible with the following use by addition of sulfuric acid or aluminum sulfate, always under intense mechanical agitation, and can be stored in a buffer chest according to the final use.

EXAMPLES

The following examples will illustrate three different applications of the general procedure previously described, using different mixtures of waste paper and producing different grades of paper and board. Measurements of brightness were made with an Elrepho meter with 457 nm. light filter, according to I.S.O. standards. Chemicals dosings are expressed in percent by weight of the chemical at 100% concentration relative to the weight of total solids in the line where said chemical is added. Sodium silicate is considered at 38° Bé and the Removink F and L as supplied.

EXAMPLE 1

The raw material is a mixture of over-issued newspapers and telephone books (white and yellow pages) in a ratio approximately 50/50. The de-inked pulps are used for the production of newsprint and telephone directory papers (white and yellow), on only one high speed paper machine.

In this installation, the pulper has a capacity of 46 m$^3$ containing 2.700 kg of waste paper. Each batch takes 30 min. Dilution water is coming from the effluent of the thickening process (4) and make-up is made using clear filtrate from the Polydisk filter (12). One percent of sodium hydroxide is added in the pulper together with 1% of a de-inking agent such as Removink L 8001 supplied by Chemicarta SPA, Milano. When this cold pulping operation is finished, the stock is pumped through turboseparator, screens and cleaners, at consistencies starting around 4% and ending at about 0,6%.

The turboseparator is equipped with a perforated plate having 3 mm. diameter holes and the rejected stock is then sent to a vibrating flat screen also having 3 mm. holes, the rejects of which are disposed of.

The accepted stock from the turboseparator is then diluted from 3% down to 1% before it passes through pressurized slotted screens fitted with 0,30 mm. slot width. The rejected stock is processed through a second stage screen having the same slot size, and rejects of the same go to a vibrating flat screen, rejects of which are disposed of.

The accepted stock from the first stage of screens is then diluted down to 0,6% consistency and processed through a conventional battery of 4 stages of Triclean cleaners. The light and the heavy rejects of the 4th stage are disposed of.

The total loss of both high and low consistency turboseparating, screening and cleaning is varies between 6% and 9% by weight, depending upon the degree of contamination of the waste paper.

No more stickies or hot melts can be seen in the pulp, and a visual inspection is confirmed by the Sommerville test, which shows less than 0,2% of shives. At that point, the pulp is totally cleaned and the only remaining contaminant is the printing ink. The pulp is then thickened up to 30% consistency in two steps, using a disk filter up to 10–12% and then a screw press up to 30%. Characteristics of the pulp are: brightness=40°–45° ISO, freeness=50°–55° SR, filler content=6–8%, temperature=20°–25° C. The ink releasing step (5) is achieved in a kneader under the following operating conditions: temperature=95°–98° C., sodium hydroxide=1,5%, sodium silicate=4%, hydrogen peroxide=1,8%, specific energy=80 KW.H/Ton during 3 minutes. The brightness of the pulp at the end of the treatment is 50°–55° ISO, and freeness is 60°–65° SR. The pulp is then diluted using all the flow of effluents coming from the second stage of washers, then squeezed up to 12% in the first washing stage.

These washers are composed of inclined screws (better known as Rice-Barton or Baker's screws), where the pulp is drained under continuous and vigorous agitation through perforated plates having 1,4 mm. diameter holes, in order to produce an effluent having approximately 0,8–1% consistency.

The thickened stock is then processed through two other similar counter current washing steps and the final usable pulp presents the following characteristics: brightness=59°–60° ISO, freeness=46°–50° SR, filler content 2–3%, consistency=12–14%. This pulp represents 78% by weight of the quantity of pulp feeding the washers (8). The balance 22% is going to the satellite circuit with the first stage effluent which shows: brightness=35°–40° ISO, filler content=20–25%, freeness=80° SR.

The capability for the ink of being removed from the fibers contained in the effluent has beenverified in the laboratory as follows: an effluent sample has been hyperwashed under fresh water shower on a 200 mesh wire ,and a handsheet has been made, showing a brightness of 56° ISO, which is very similar to the brightness of the final primary pulp. This effluent has then been mixed together with 4% of a special ink-collecting agent purposely designed for this application by Chemicarta SPA, Milano, and kept for 5 min. under agitation at 30° C.

The mixture is then processed through one single stage conventional flotation cell, Voith open type, during 15 min.. The loss of weight through the cell is 15–20%, which means only 3–4,5% respect to the total quantity of pulp entering the washers. We have found that addition of 0,5% to 1% of calcium chloride or calcium hydroxide together with the collector, ahead of the flotation, helps controlling the foam and the ink coagulation when low ash content pulps are processed.

The total alkalinity is then dropped down to pH=7–8 with addition of 1% of sulfuric acid on the suction side of the centrifugal pump feeding the disk filter (12). At this point, the pulp shows a brightness=53°–56° ISO, a filler content=15–20% and a freeness=78°–80° SR.

The disk filter (12) is a Polydisk filter sized according to a specific filtering factor=20 liters/min./m2. Besides this unusual value, it is also necessary to feed the mat-peeling showers with air instead of water, in order to reach the maximum possible consistency of the discharged pulp.

Using the above mentioned parameters, a final consistency of 8% to 10% could be obtained and the clear filtrate shown less than 100 ppm average suspended solids, measured on paper filter, black label.

The pulp is then brought to pH=6 and sent to a buffer chest having 8 hours total retention time. From this point, it is then pumped to the mixing chest of the paper machine at controlled flow rates according to the paper grade actually produced and in function of the mean composition of the secondary pulp.

The clear filtrate from the Polydisk filter is then totally recycled in order to dilute the stock ahead of the third washing stage and make-up is provided by fresh industrial water which does not contain aluminium ions.

The application of such a process in a paper mill having one single paper machine offers the following advantages:

(a) possibility to maintain constant freeness and ash content during a grade run, independently from the incoming waste paper characteristics, thus allowing the paper machine to run at maximum speed and efficiency;

(b) possibility to achieve very quick grade change, exactly as whenusing virgin pulp and fillers, without the need to intervene a long time before in the waste paper plant, thus permitting an easier and more constant operation of that plant;

(c) possibility to always use the highest possible quantity of recycled fibers in the paper, by the free disposal of each one of the two fractions and their use in the optimum way.

(d) possibility to produce totally cleaned pulps having the same standards of cleanliness than virgin pulps and thus offering the highest possible runability in the paper machine room, particularly being free of any "sticky" or "hot melt" or ink vehicle free particle.

EXAMPLE 2

The raw material is a mixture of printed continuous stationary , old books and office file, in a ratio 50/50.

The de-inked pulp is used to produce, on three distinct paper machines: (a) light weight machine-glazed wrapping papers, (b) fine papers for writing and printing, including wood containing printing grades, (c) stationary and continuous print-out papers.

The operation is similar to example (1) up to the thickening step (4), although it is not necessary to add any chemical agent—caustics or de-inking agent—during the pulping step (2). When entering the ink-releasing step (5), the pulp has a brightness=60° ISO, a freeness=40°–45° SR, and a filler content=20%.

The ink-releasing equipment is the same as for example (1) but operating parameters are as follow: Removink L8001=0,3%; hydrogen peroxyde=0,5%, sodium hydroxyde=1%, sodium silicate=3%. All other parameters remain unchanged. At the end of the process, the pulp has shown a brightness increase of 2° ISO and freeness did not show any appreciable variation.

The pulp is then washed by mean of three washing stages as for example (1), but the design of the perforated plates are different: the first stage is fitted with 2 mm. diameters holes, the second and the third stages are equipped with 1,4mm. diameter holes. Also the feed consistency of the washing stages is different, being 2,5%. With these parameters, the final washed primary pulp has shown following characteristics: brightness=75° ISO, filler content below 3%, freeness 27°–30° SR.

The effluent leaving the first washers has a consistency between 1% and 1,2%, a filler content=60%, brightness=50° ISO, and freeness=70° SR.

The flotation cell used in this application is a high consistency Swemac type, and heavy stock has been pumped from chest (6) and mixed together with the effluent before the flotation, in order to raise the consistency up to 1,5%. In this way, the two lines (primary by washing and secondary by flotation) have exactly the same solids flow rate, or the same capacity in tons/day, but produce two pulps having opposite characteristics. This extraction also procures long fibers which will help the final filtration (12).

This extraction could have been done using washed pulp and this would have increased the brightness of the secondary pulp. But in such a case, the washing equipment would have to be sized for 30% more capacity, which is not a worthy choice in our case.

The flotation is then conducted with only 2% of the same collector (Removink F) and the retention time through the cell is only 10 min., thus producing a loss of weight of 10% (which means 5% of the total pulp).

After acidification at pH=8 ahead of the disk filter, the pulp shows a brightness=70° ISO, a filler content=35–40%, a freeness=65°–70° SR.

The Polydisk filter can be sized using a filtering factor=25 liters/min./m2, and produces an effluent containing 70–100 ppm suspended solids. The other steps of this application are similar to the ones described in example (1).

The application of such a process in a paper mill having several paper machines as in this example is offering the following advantages:

(a) possibility to produce a pulp having physical and cleanliness characteristics similar to the ones of a virgin chemical pulp, thus usable for the production of fine light weight papers, with good Yankee dryer glazing capabilities;

(b) possibility to produce a pulp having physical and optical charcteristics of a mixture of fine chemical and/or ground-wood pulp, and mineral fillers, thus usable for the production of printing papers where high opacity and smoothness are requested.

(c) possibility to mix these two pulps together in a ratio which can be very much different from the original one coming together with the raw material.

EXAMPLE 3

The raw material is a mixture of low quality printed waste, containing old books, office waste and stationary, and some newspapers and magazines, in variables proportions.

The mill has one multiply board machine, and produces high quality folding box board, which can be on-machine coated and must show an excellent multicolour offset printing aptitude. The white top liner is composed of 100% de-inked primary pulp and the underliner uses the secondary pulp, mixed with other pulp Pulping is conducted in a continuous way with the same parameters as for example 1. The cleaning and screening treatment (3) is simplified and composed of centrifugal high-density cleaners, followed by a turbo-separator, working at 3% consistency. The following thickening stage is also simplified and composed of inclined screws producing pulp at 15% consistency, followed by a screw press. The finest contaminants will be detached and better dispersed during the ink-releasing step (5) and then carried away with the effluent during the washing stage. They will remain in the secondary pulp thus contributing to add weight and volume to the board, as the underliner does not need to be particularly cleaned.

The pulp entering the ink-releasing and dispersing step shows a brightness=50° ISO, a filler content=25–30%. The operating parameters are the same as for example (1), but the brightness drops down to 46°–48° ISO.

The following washing step has only two stages, which are fed at 2,5% consistency. The perforated plates of the inclined screws have 1,6 mm. diameter holes, and it has been found that the characteristics of the effluent are very similar to the one of example 1.

The washed primary pulp shows a brightness=68° ISO, a filler content=4% and a freeness=45°–50° SR. The fine cleaning of the primary pulp is achieved with the cleaners and the screens installed ahead of the board machine, which is sufficient to reach the desired quality. It must be said that the contaminants have been thoroughly dispersed in the kneader (5) and most of them have left this primary pulp during the washing step.

The satellite circuit is also simplified because the brightness of the underliner has only a third-order influence on the final brightness of the coated board. We have observed that a brightness of the underliner secondary pulp in the 50° ISO range was sufficient to insure the required brightness 80° ISO of the coated board, providing that the top liner primary pulp has 70° ISO. Thus, the flotation time has been reduced below 10 min. and the dosing of the collector has been kept below 2%. We have also observed that it was possible to run without any chemical when lower quality grades are produced, but no compromise can be applied on the dispersion effect, because black spots in the underliner are always visible even through the coated top liner.

The application of such a process to the production of stratified board is offering the following advantages:

(a) possibility to totally replace chemical pulp or high quality selected unprinted waste paper by a low value and large availability raw material;

(b) simplification of the main line by eliminating the fine screening and cleaning equipment;

(c) increase of the total yield, by transferring in the secondary pulp (and then in the underliner or in the middle ply) all finely dispersed contaminants which are not acceptable in the top liner.

I claim:

1. A method of treating a mixture of printed and contaminated waste paper in order to produce a pulp for use in the manufacture of paper and paperboards, said waste paper containing non-ink contaminants including stickies, which method comprises:

(a) forming a first aqueous fibrous suspension of said waste paper at room temperature by applying specific mechanical energy lower that 50 KW.H/Ton to form a pumpable slurry and to release substantially all of the non-ink contaminants including the stickies, from the surface of the paper and without dispersing such non-ink contaminants as finely divided particles throughout the fibrous suspension;

(b) removing substantially all of the non-ink contaminants including the stickies, which have been released without dispersal as finely divided particles from the first fibrous suspension by screening and cleaning at room temperature to form a second aqueous fibrous suspension substantially free of the non-ink contaminants including the stickies;

(c) after the step of removing the non-ink contaminants softening the ink vehicles and weakening their binding with the surface of the fibers by submitting the second fibrous suspension at a consistency of more than 15% to the simultaneous actions of (A) a high temperature between 85° and 130° C., (B) high shear forces substantially corresponding to a specific mechanical energy of more than 50 KW.H/Ton applied at the said consistency of more than 15% and (C) at least one deinking agent under strong alkaline conditions having a pH of at least 9; and (d) detaching the ink particles from the surface of the fibers and dispersing them into the second fibrous suspension by submitting the second fibrous suspension to the simultaneous actions of (A) high temperature between 85° and 130° C., (B) high shear forces substantially corresponding to a specific mechanical energy of more than 50 KW.H/Ton applied at the said consistency of more that 15% and (C) at least one chemical dispersing agent, under strong alkaline conditions having a pH of at least 9 whereby higher specific energy inputs and higher temperatures are used to detach the ink particles from the fibers of the second fibrous suspension after removal of the non-ink contaminants than are used on the first fibrous suspension before removal of the non-ink contaminants;

(e) limiting the total duration of the ink softening and detaching steps (c) and (d) to a range between 2 and 10 minutes and (f) removing the detached ink particles from the second fibrous suspension to provide a brightness of at lesat 59 ISO the final pulp.

2. The method of claim 1 wherein the specific energy applied to the fibrous suspension during the forming step (a) is applied for approximately 20 minutes.

3. The method of claim 1 wherein the ink softening and detaching steps (c) and (d) are conducted at a pressure higher than the atmospheric pressure.

4. The method of claim 1 wherein the total duration of the ink softening and detaching steps (c) and (d) is kept between 3 and 5 minutes.

5. the method of claim 1 wherein the total specific energy applied during the ink softening and detaching steps (c) and (d) is about 80 KW.H/Ton.

6. The method of claim 1 wherein the ink softening and detaching steps (c) and (d) are performed simultaneously in a single apparatus.

7. The method of claim 1 wherein the ink softening and detaching steps (c) and (d) are performed separately in two different pieces of equipment.

8. The method of claim 1 wherein the removing of the ink particles from the fibrous suspension is achieved by washing.

9. The method of claim 1 wherein the alkalinity of the fibrous suspension in steps (c) and (d) is obtained by adding any one of the following chemicals:
sodium hydroxide, potassium hydroxide, calcium hydroxide, magnesium hydroxide, sodium carbonate, sodium phosphate, sodium tripolyphosphate, sodium pyrophosphate, sodium silicate.

10. The method of claim 1 wherein an oxidizing agent is added during the ink softening and detaching steps (c) and (d).

11. The method of claim 1 wherein a bleaching action is performed during the ink softening and detaching steps (c) and (d).

12. The method of claim 1 wherein the ink softening and detaching steps (c) and (d) are performed simultaneously in a triturator.

13. The method of claim 1 wherein the ink softening and detaching steps (c) and (d) are performed simultaneously in a disintegrator.

14. A method of claim 1 wherein the ink softening and detaching steps (c) and (d) are performed separately in a steaming chamber followed by a disperser.

15. The method of claim 1 wherein the step of removing the ink particles from the fibrous suspension is achieved by froth flotation.

16. The method of claim 1 wherein the step of removing the ink particles from the fibrous suspension is achieved by washing and froth flotation.

17. The method of claim 1 wherein the alkalinity of the fibrous suspension in steps (c) and (d) is obtained by adding a mixture of chemicals selected from the group consisting of, sodium hydroxide, potassium hydroxide, calcium hydroxide, magnesium hydroxide, sodium carbonate, sodium phosphate, sodium tripolyphosphate, sodium pyrophosphate, sodium silicate.

18. The method of claim 1 wherein the ink softening and detaching steps (c) and (d) are achieved at a consistency between 25% and 30%.

* * * * *